US010897392B2

(12) United States Patent
Mishra et al.

(10) Patent No.: US 10,897,392 B2
(45) Date of Patent: Jan. 19, 2021

(54) CONFIGURING A COMPUTE NODE TO PERFORM SERVICES ON A HOST

(71) Applicant: Nicira, Inc., Palo Alto, CA (US)

(72) Inventors: Rahul Mishra, Mountain View, CA (US); Chidambareswaran Raman, Sunnyvale, CA (US); Raju Koganty, San Jose, CA (US); Fenil Kavathia, Sunnyvale, CA (US)

(73) Assignee: NICIRA, INC., Palo Alto, CA (US)

( * ) Notice: Subject to any disclaimer, the term of this patent is extended or adjusted under 35 U.S.C. 154(b) by 45 days.

(21) Appl. No.: 16/005,628

(22) Filed: Jun. 11, 2018

(65) Prior Publication Data
US 2019/0379578 A1  Dec. 12, 2019

(51) Int. Cl.
*H04L 12/24* (2006.01)
(52) U.S. Cl.
CPC .............. *H04L 41/0803* (2013.01)
(58) Field of Classification Search
CPC .. G06F 11/1446; G06F 11/1456; G06F 12/14; G06F 13/00; G06F 17/30067; G06F 17/30212; G06F 17/30575; G06F 21/00; G06F 21/10; G06F 21/31; G06F 21/34; G06F 2221/2107; G06Q 20/341; G11B 20/00021; G11B 20/00086; H04L 9/08; H04L 9/32; H04L 9/0827; H04L 9/0836; H04L 9/0897; H04L 9/3271; H04L 29/06; H04L 29/08072; H04L 41/12; H04L 41/22; H04L 41/0213; H04L 63/08; H04L 63/0428; H04L 63/0853; H04L 65/102; H04L 2209/56; H04L 12/24; H04L 41/0803

USPC ........ 707/634; 709/223; 713/168, 193; 726/9
See application file for complete search history.

(56) References Cited

U.S. PATENT DOCUMENTS

| 9,524,183 | B1 | 12/2016 | Phelan et al. |
| 9,697,144 | B1 | 7/2017 | Chen et al. |
| 10,289,457 | B1 | 5/2019 | Slawomir |
| 2011/0313973 | A1* | 12/2011 | Srivas ............ H04L 65/102 707/634 |
| 2015/0370586 | A1 | 12/2015 | Cooper et al. |
| 2016/0094384 | A1 | 3/2016 | Jain et al. |
| 2016/0359955 | A1 | 12/2016 | Gill et al. |

(Continued)

Primary Examiner — Robert B Harrell
(74) Attorney, Agent, or Firm — Adeli LLP

(57) ABSTRACT

Some embodiments provide a novel method for configuring a service data compute node (DCN) executing on a host computer to perform network services (e.g., firewall, load balancing, intrusion detection, network address translation (NAT), other middlebox services, etc.) for several DCNs executing on the host computer. The method receives, at the service DCN, an identification of a set of container specifications that will be implemented (e.g., will be executed by) the service DCN. The method then retrieves the identified set of container specifications (e.g., container images) from a container repository storing multiple received container specifications. In some embodiments, the container specifications include container images generated by a third party service partner for providing a particular service or set of services and stored in a container repository. The method then instantiates the retrieved containers to provide the identified network services to data messages received at the service DCN.

18 Claims, 10 Drawing Sheets

(56) References Cited

U.S. PATENT DOCUMENTS

| | | |
|---|---|---|
| 2017/0063928 A1 | 3/2017 | Jain et al. |
| 2017/0353373 A1 | 12/2017 | Agarwal et al. |
| 2018/0088978 A1 | 3/2018 | Li et al. |
| 2018/0124061 A1 | 5/2018 | Raman et al. |
| 2018/0309747 A1 | 10/2018 | Sweet et al. |
| 2019/0310972 A1 | 10/2019 | Nagey et al. |
| 2019/0379579 A1 | 12/2019 | Mishra et al. |

\* cited by examiner

CONFIGURING A COMPUTE NODE TO PERFORM SERVICES ON A HOST

BACKGROUND

Middlebox services have historically been hardware appliances that are implemented at one or more points in a network topology in an enterprise or a datacenter. With the advent of software defined networking (SDN) and network virtualization, traditional hardware appliances do not take advantage of the flexibility and control that is provided by SDN and network virtualization. Accordingly, in recent years, some have suggested various ways to provide middlebox services on hosts that execute virtual machines (VMs). Some such approaches utilize service virtual machines (SVMs) that execute on hosts concurrently with guest virtual machines. Existing approaches, however, lead to SVM sprawl due to different SVMs running on the same host to provide different middlebox service operations.

BRIEF SUMMARY

Some embodiments provide a novel method for configuring a service data compute node (DCN) executing on a host computer to perform network services (e.g., firewall, load balancing, intrusion detection, network address translation (NAT), other middlebox services, etc.) for several DCNs executing on the host computer. The method receives, at the service DCN (e.g., a service virtual machine (SVM)), an identification of a set of container specifications that will be implemented (e.g., will be executed by) the service DCN. The method then retrieves the identified set of container specifications (e.g., container images) from a container repository storing multiple received container specifications. In some embodiments, the container specifications include container images generated by a third party service partner (e.g., Palo Alto Networks®, F5®, Symantec®, etc.) for providing a particular service or set of services and stored in a container repository. The method then instantiates the retrieved containers to provide the identified network services to data messages received at the service DCN. Once the containers are executing on the service DCN, the method provides, using the containers, the partner network services to received data messages.

In some embodiments, the identification of the set of container specifications is received from a management DCN (e.g., a VMware NSX® manager compute node). The management DCN, in some embodiments, also sends a set of policies for applying the services to data messages from or to the several DCNs executing on the host computer. In some embodiments, a policy is a service policy that indicates a service chain (i.e., an ordered set of services to perform on the data message). A policy, in some embodiments, specifies a particular network service (or set of network services) to perform on a data message based on data message attributes.

The method, in some embodiments, sends a data message received by the service DCN to a set of instantiated containers in a sequence based on a policy or set of policies. The service chain, in some embodiments, is determined based on a set of policies each indicating a need for a different partner network service and a separate policy determining a priority among partner network services (e.g., firewall applied to incoming data messages before performing NAT). In some embodiments, the service DCN waits to receive the data message from a first container in the service chain before sending the data message to a next container in the service chain. In some embodiments, the service DCN sends the data message to a set of containers in the service chain in parallel, and, if a container indicates that it has changed a data message, resends the data message to containers providing partner network services that appear after the container that changed the data message in the service chain.

Some embodiments provide a method for efficient data message transfer across a hypervisor, service DCN, and containers implementing partner network services. The method allocates memory to a service DCN that operates a set of containers for providing partner network services for data messages received by the service DCN. The service DCN and the containers share the allocated memory and the method stores data messages received by the service DCN in the allocated memory. The method then accesses the data message stored in the shared memory from a set of partner network service containers to perform the partner network services. In some embodiments, the host machine or a process of the host machine on which the service DCN executes also shares the allocated memory. The host machine process, in some embodiments is a kernel process.

As described above, the method receives a set of policies that are used to determine the set of partner network service containers that will access the data message in some embodiments. In some embodiments, a policy is a service policy that indicates a service chain (i.e., an ordered set of services to perform on the data message). A policy, in some embodiments, specifies a particular network service (or set of network services) to perform on a data message based on data message attributes.

The method, in some embodiments, communicates between a service DCN process and a container process through a message queue. In some embodiments, a unique message queue or pair of message queues is maintained for each container or container process. The method uses the message queue, in some embodiments, to indicate to a container that it should access the data message and provide the partner network service associated with the container to the data message. In some embodiments, the partner network service container communicates to the service DCN that it has provided the partner service using the message queue associated with the container. The method, in some embodiments, only indicates to a container that it should access the data message when all containers that come before it in the service chain have indicated that they have processed the data message. In other embodiments, the method indicates to at least one container that it should access the data message before all previous containers in the service chain have indicated that they have processed the data message in order to allow for parallel processing of the data message. In embodiments allowing for parallel processing, if a container indicates that it has modified the data message, the method indicates to containers that come after the container that modified the data message in the service chain that the data message should be accessed again to provide the partner network service to the modified data message.

The shared memory, in some embodiments, is able to be read by multiple processes, but is only allowed to be written to by at most a single process at any given time. In some embodiments, a synchronization mechanism is used to control which process (e.g. container process, service DCN process, etc.) can write to (e.g., is the owner of) the shared memory. In some embodiments, a named file (e.g., a named semaphore file) is used by the synchronization mechanism to keep signaling intact even if the shared memory is corrupted.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
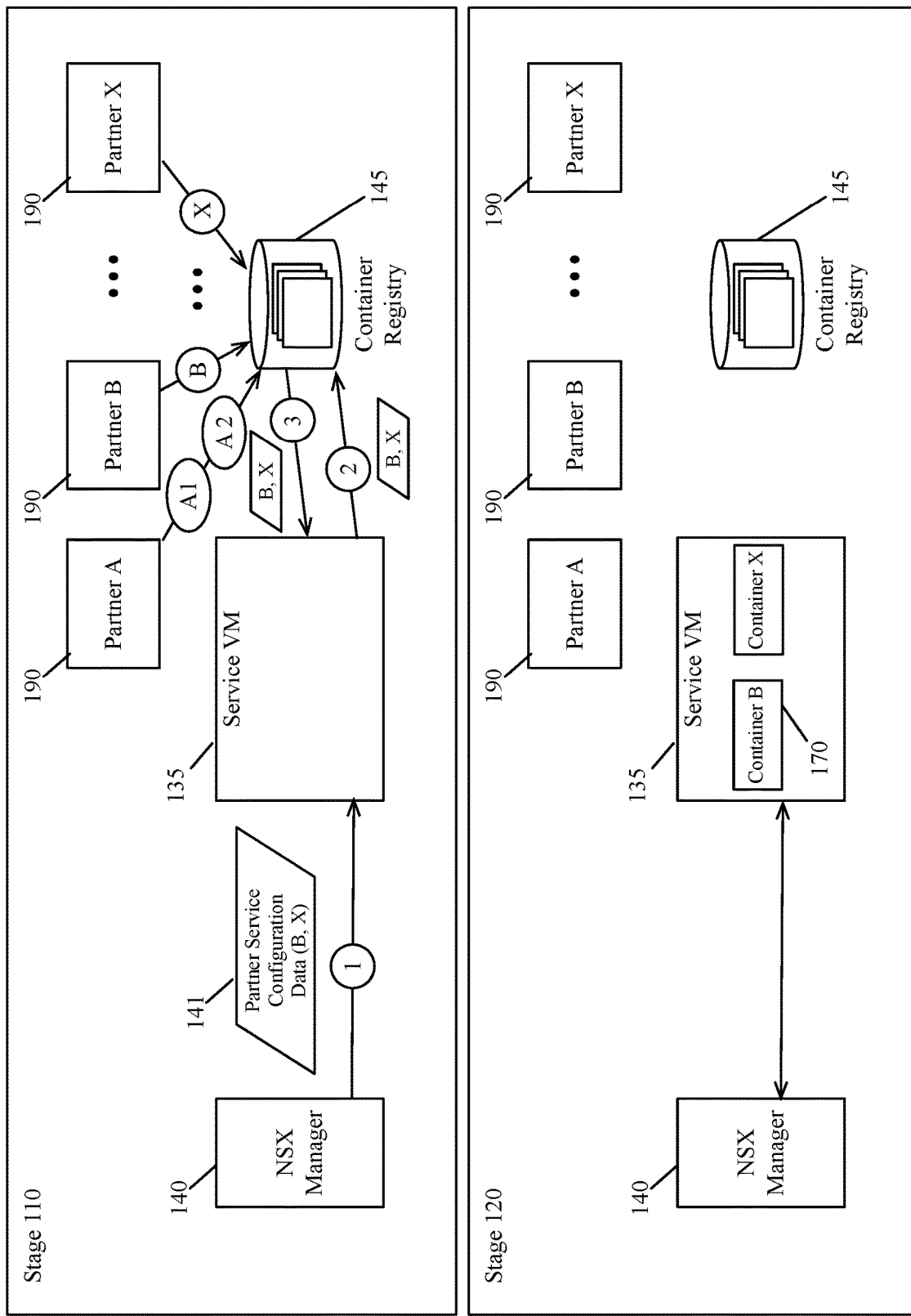
FIG. 1 illustrates a container registry being populated by a set of partners and a service DCN implementing a set of identified partner network service containers.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel method for configuring a service data compute node (DCN) executing on a host computer to perform network services (e.g., firewall, load balancing, intrusion detection, network address translation (NAT), other middlebox services, etc.) for several DCNs executing on the host computer. The method receives, at the service DCN (e.g., a service virtual machine (SVM)), an identification of a set of container specifications that will be implemented (e.g., will be executed by) the service DCN. The method then retrieves the identified set of container specifications (e.g., container images) from a container repository storing multiple received container specifications. In some embodiments, the container specifications include container images generated by a third party service partner (e.g., Palo Alto Networks®, F5®, Symantec®, etc.) for providing a particular service or set of services and stored in a container repository. The method then instantiates the retrieved containers to provide the identified network services to data messages received at the service DCN. Once the containers are executing on the service DCN, the method provides, using the containers, the partner network services to received data messages.

In some embodiments, a data message associated with a DCN executing on the host is received at a module executing on the host. In some embodiments, the module is a port of a software forwarding element (SFE) that executes on the host to forward data messages to and from the DCNs executing on the host from and to DCNs and other machines operating outside of the host. The data message is supplied to the service virtual machine (SVM) that executes on the host and on which several partner network service software containers (service containers) execute. One or more of the service containers then perform a set of one or more services on the data message. The SVM, in some embodiments, indicates that the set of services has been performed on the data message.

In some embodiments, the data message is forwarded to the data message's destination after receiving the indication from the SVM. The data message's destination in some embodiments can be a DCN executing on the host, or a DCN or other machine operating outside of the host. Instead of forwarding the data message to its destination, the method in some embodiments might discard the data message in response to the set of service operations. For example, one of the service operations might be a firewall operation that discards the data message.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Software containers, on the other hand, are constructs that in some embodiments run on top of an operating system (e.g., an operating system (e.g., Photon OS®) of a host, a guest VM, or a service VM) without the need for a hypervisor or separate guest operating system. In some embodiments, containers are set up through an operating-system-level virtualization in which the kernel of an operating system allows the existence of multiple isolated user-space instances (instead of just one). The host operating system of some embodiments uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

As used in this document, data messages refer to a collection of bits in a particular format sent across a network. One of ordinary skill in the art will recognize that the term data message may be used herein to refer to various formatted collections of bits that may be sent across a network, such as Ethernet frames, IP packets, TCP segments, UDP datagrams, etc. Also, as used in this document, references to L2, L3, L4, and L7 layers (or layer 2, layer 3, layer 4, layer 7) are references respectively to the second data link layer, the third network layer, the fourth transport layer, and the seventh application layer of the OSI (Open System Interconnection) layer model.

FIG. 1 illustrates a container registry 145, a service virtual machine (SVM) 135, and a management compute node, NSX manager 140, that are used to configure the SVM 135 to implement a set of containers 170 that are provided by partners 190. Stage 110 illustrates a set of partners (e.g., third-party vendors or developers) 190 populating a container registry 145 with container specifications (e.g., container images) A1, A2, and B-X. NSX manager 140, in some embodiments, communicates with container registry 145 to maintain a list of available partner network services and their associated containers. Container registry 145, in some embodiments, is a database or other storage. In some embodiments, the container registry 145 is a secured private docker repository that provides encryption or authentication protection for uploaded container images.

In some embodiments, a development environment is provided to allow partners to create container images that are able to be stored in the container registry for instantiation by an SVM. The development environment, in some embodiments, is a workbench virtual machine (VM) Open Virtualization Format (OVF) that (1) provides a set of scripts (e.g., bash or python scripts), (2) provides sample service container modules, and (3) provides a software development kit (SDK) and sample code that runs on the single SVM that implements the containers. In some embodiments, the sample scripts include scripts for (i) the creation of a Docker® file, (ii) automatically creating a dockerfile from input text file and running a container based on the dockerfile, and (iii) building and uploading a container image to the container registry (e.g., an NSX private repository).

Stage 110 also illustrates NSX manager 140 sending partner service configuration data 141 to SVM 135 as operation '1.' In some embodiments, the configuration data 141 is based on a user (e.g., tenant) profile or input that indicates the partner network services desired or paid for by the user. The partner service configuration data 141 includes an identification of the containers (e.g., the container images) to retrieve from the container registry to implement the set of desired partner network services. Partner service configuration data, in some embodiments, is sent whenever there is a change in the set of partner network services that a user desires or has access to (e.g., a user adds or removes a partner network service or stops paying for a particular service). In FIG. 1, partner service configuration data 141 indicates that SVM 135 should instantiate service containers B and X. In some embodiments, partner service configuration data 141 also includes a set of network service policies that SVM 135 uses to determine which service containers should process a particular data messages SVM 135 receives.

Operation (or data message) '2' represents service VM 135 sending a request to container registry 145 for container images B and X as identified by the NSX manager 140 through partner service configuration data 141. In some embodiments, the request includes an identifier associated with the requested service container images. Container registry 145 receives the request from SVM 135 and responds by sending, as operation '3,' the container images for containers B and X (to provide the partner network services associated with service containers B and X) to SVM 135. At stage 120, SVM 135 instantiates containers 170 for partner network services B and X. Once containers B and X have been instantiated on SVM 135, SVM 135 is ready to provide the partner network services associated with service containers B and X. The service container configuration process is described in more detail in relation to FIGS. 3 and 4.

Figure 3:
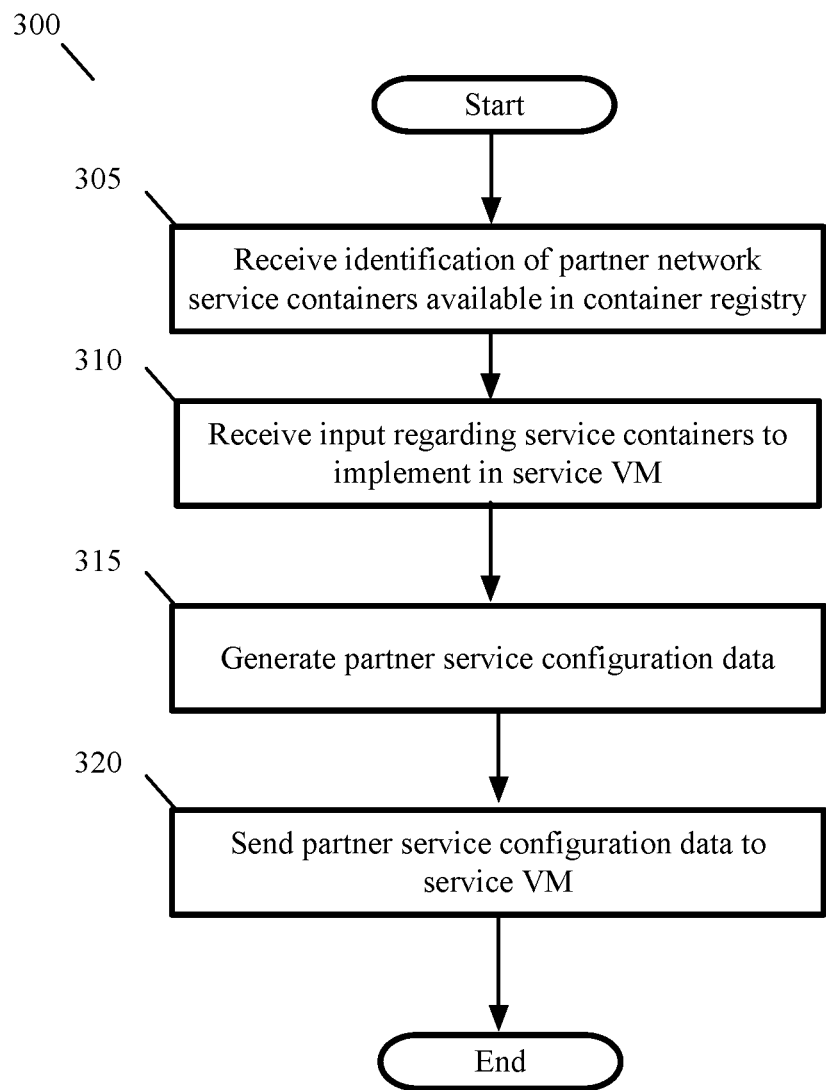
FIG. 3 conceptually illustrates a process performed by a controller computer to configure a service data compute node to provide partner network services.

FIG. 3 conceptually illustrates a process 300 performed by a controller computer to configure a service data compute node (e.g., a service virtual machine (SVM)) to provide partner network services. In some embodiments, the controller computer is part of a cluster of controller computers. A controller computer, in some embodiments, executes on a different physical host machine than a service DCN.

Process 300 begins when the controller computer receives (at 305) an identification of partner network services that are available in a container registry. In some embodiments, a controller computer stores the information in a container identification database that is periodically updated to ensure that the database reflects the current contents of the container registry. In some embodiments, the identification is a complete list of container images in the container registry. In some embodiments, the controller computer receives a first identification that is a full list (e.g., upon controller computer startup), while subsequent identifications provide a list of changes from the last update sent to the controller computer. The identification, in some embodiments, includes a combination of any of a location in the container registry, a vendor associated with the container image, policies for accessing the container image, a service identifier, a service type, etc.

Once the identification of the available container images has been received, the process receives (at 310) input regarding service containers that should be implemented by a particular service DCN (e.g., an SVM). In some embodiments, the input is received from a user (e.g., a network administrator) through a user interface. The user interface, in some embodiments, presents a list of available partner network services (e.g., in a list, a drop-down menu, etc.) for a user to select for implementation on a particular SVM for a particular set of compute nodes in a logical network (e.g., a logical network segment, or compute nodes of a particular user group). Logical networks, in some embodiments, are implemented for multiple tenants on a same physical host machine and a separate SVM is configured to provide partner network services for each tenant's logical network. The input is received, in some embodiments, automatically from other sources (e.g., third-party vendors) based on a user subscribing to the partner network service with the other source (e.g., third-party vendor).

After receiving the input (at 310), the process generates (at 315) partner service configuration data based on the received input. The partner service configuration data indicates the partner network services that will be implemented by the service DCN. In some embodiments, the service configuration data is a set of instructions and data that an SVM uses to retrieve the container specifications (e.g., container images) from the container registry, instantiate the partner network service containers, and implement the partner network services. The data used to implement the partner network services, in some embodiments, is a set of policies that specify attributes of data messages to which particular partner network services should be applied and, in some embodiments, the order in which a service chain of partner network services should be implemented. In some embodiments, the configuration data includes data for configuring the service DCN to communicate with the containers in at least one of two ways which are described in relation to FIGS. 5A-B (i.e., using sockets (e.g., sockets of a docker bridge)), 7 (i.e., using a shared memory and a set of message queues), and 8 (a second embodiment using shared memory and a set of message queues).

Once the partner service configuration data has been generated (at 315), the process sends (at 320) the partner service configuration data to the service DCN. The service DCN uses the partner service configuration data to retrieve the container specifications from the container registry. The retrieved container specifications are then used by the service DCN to instantiate the partner network service containers. In embodiments in which policy data is included in the configuration data, the service DCN stores the policy data to determine which partner network services (and in which order) to apply to data messages received by the service DCN.

Figure 4:
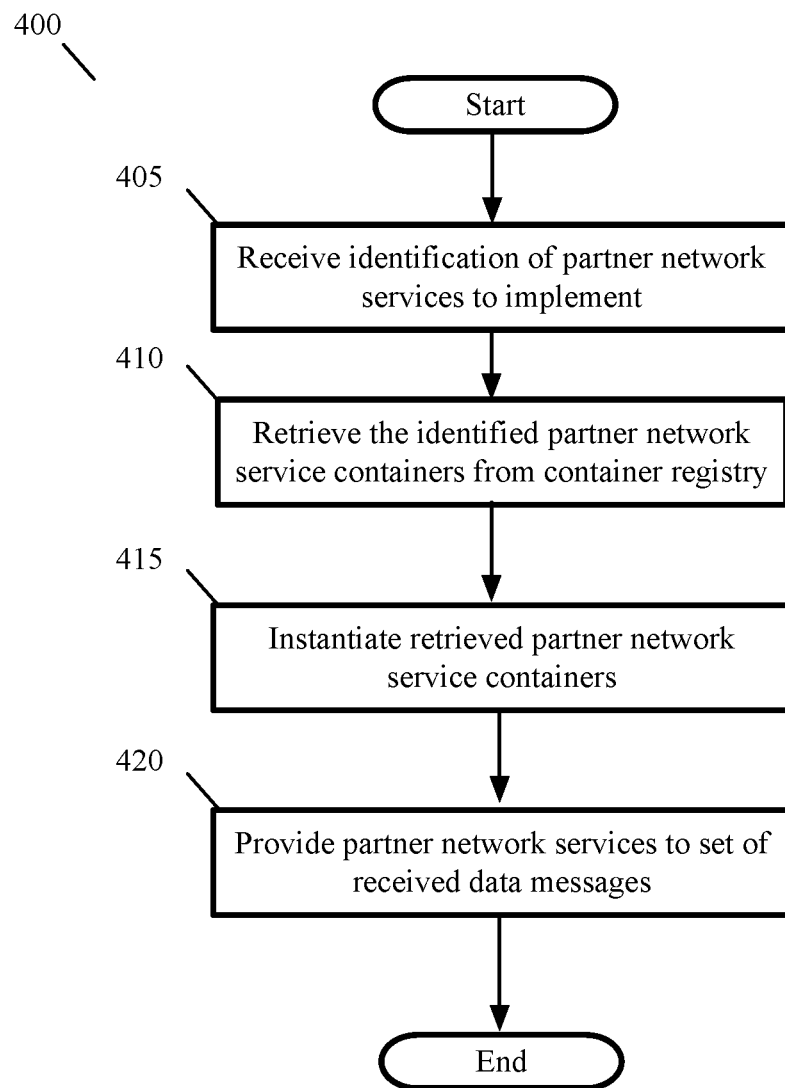
FIG. 4 conceptually illustrates a process performed by a service DCN as part of a configuration process.

FIG. 4 conceptually illustrates a process 400 performed by the service virtual machine (SVM) of FIG. 1 as part of a configuration process for configuring the SVM to perform a set of partner network services. The process begins (at 405) by receiving an identification of a set of partner network services that the SVM should implement. In some embodiments, the identification is received from a controller computer (e.g., NSX manager 140). The identification, in some embodiments, includes at least one of (1) an identification of a partner service to be implemented at the SVM, (2) an identification of a container image in the container registry to instantiate at the SVM, (3) a set of commands to be passed along to the container registry to retrieve a set of container images. In some embodiments, the controller computer also sends a set of policies that relate to the identified service containers. The policies, in some embodiments, recite a set of attributes (e.g., a five tuple identifier) and a set of services that should be applied when a data message has the recited set of attributes. In some embodiments, the policies are provided with a priority such that if a match is found in a higher priority policy a lower priority policy will not be reached. In some embodiments, each policy indicates a single service to provide based on a set of data message attributes and a service chain is defined based on the set of policies that recite a set of attributes that match a particular data message. When a set of services are separately identified as being necessary, some embodiments specify a priority of services such that a data message is sent to the service containers in a particular order. In some embodiments, the particular order is different for data messages that are intercepted on their way from or on their way to DCNs executing on the host computer.

The process then retrieves (at 410) the identified partner network service containers (or container images) from a container registry. In some embodiments, retrieving the identified partner network service containers (or container images) includes formulating a request for the identified partner network service containers using the information provided by the controller computer. When the controller computer provides the set of commands to be sent to the container registry, retrieving the partner network service containers includes forwarding the provided set of commands to the container registry and receiving the container images in response.

Once the service containers (or service container images) have been retrieved, the process instantiates (at 415) the retrieved partner network service containers. In some embodiments, the instantiated containers include service containers for providing network services such as network address translation (NAT), firewall, load balancing, intrusion detection, etc. In some embodiments, instantiated containers are associated with multiple vendors, for example, Palo Alto Networks, F5, Symantec, etc. and similar partner network services are provided for by different vendors so that multiple load balancer service containers, for example, execute on the same SVM.

After instantiating (at 415) the service containers, the service VM provides (at 420) the partner network services. In some embodiments, the service VM provides only a subset of the partner network services provided by the instantiated service containers for a particular data message received at the service VM. As described in relation to FIG. 2, the set of service containers that provide services to a particular data message, in some embodiments, is determined by a set of policies based on the attributes of the particular data message. In some embodiments, the order of providing the services is also determined by the set of policies.

Figure 2:
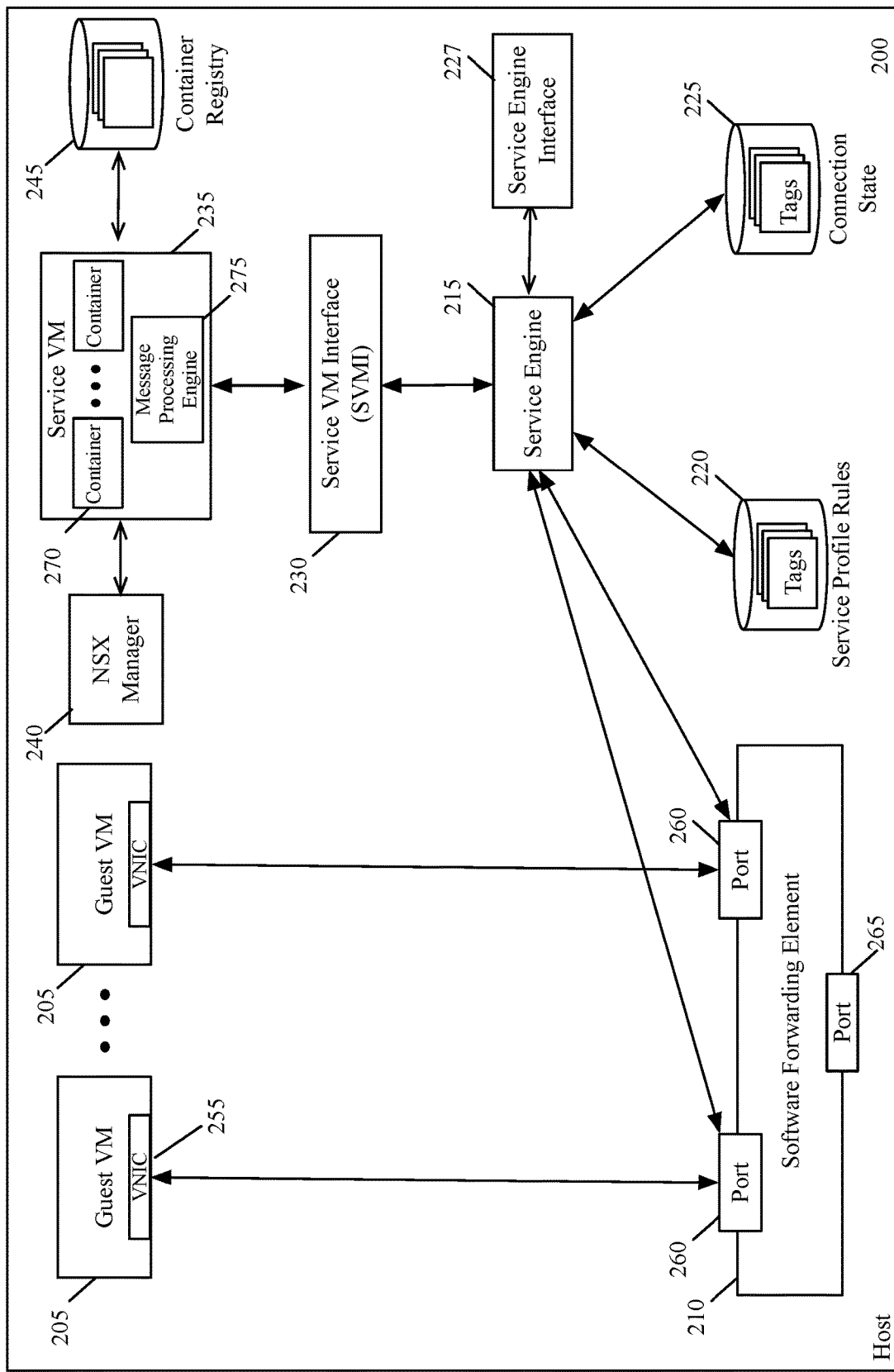
FIG. 2 illustrates a virtualization architecture of a host computer (e.g., a server) that implements the method of some embodiments of the invention.

FIG. 2 illustrates a virtualization architecture of a host computer (e.g., a server) that implements the method of some embodiments of the invention. Specifically, in some embodiments, virtualization architecture 200 includes a service engine 215 that (1) identifies a set of one or more service operations that have to be performed on a data message associated with one of the guest virtual machines (GVMs) executing on the host, (2) assigns a tag with the data message to identify a set of one or more service operations that have to be performed on the data message, and (3) provides the data message and its assigned tag to a SVM 235 so that one or more service containers 270 executing on this SVM can perform the set of service operations on the data message. In some embodiments, the host's service engine 215 does not associate a received data message with a service tag when it determines that at least one service has to be performed for the data message. Instead, it just forwards the data message to the SVM after it determines that at least one service operation has to be performed on the data message.

FIG. 2 illustrates an embodiment that assigns service tags at the service engine 215, a more detailed description of an embodiment in which service engine 215 does not assign service tags is provided in U.S. patent application Ser. No. 15/803,364, filed Nov. 3, 2017, now published as U.S. Patent Publication 2018/0124061, which is hereby incorporated by reference. As shown, the virtualization architecture 200 includes several GVMs 205, a software forwarding element 210, a service engine 215, a rule data storage 220, a connection state data storage 225, a service engine interface 227, an SVM interface (SVMI) 230, an SVM 235 (in some embodiments, SVM 235 includes a service rule data storage and a connection state data storage (not shown)), an NSX manager 240, and a container registry 245. NSX manager 240 and container registry 245, in some embodiments, execute on separate host computers. As further shown, the SVM 235 includes several service containers 270 and a message-processing engine 275. In some embodiments, the software forwarding element 210, the service engine 215, the rule data storage 220, the connection state data storage 225, the service engine interface 227, and the SVMI 230 operate in the kernel space of a hypervisor executing on the host, while the GVMs 205 and the SVM 235 (including, in some embodiments, a rule data storage and a connection state data storage) operate in the hypervisor's user space.

The GVMs 205 are virtual machines executing on top of the hypervisor (not shown) that executes on the host. Examples of such machines include webservers, application servers, database servers, etc. In some cases, all the GVMs belong to one entity, e.g., an enterprise that operates the host. In other cases, the host executes in a multi-tenant environment (e.g., in a multi-tenant data center), and different GVMs may belong to one tenant or to multiple tenants.

As shown, each GVM 205 includes a virtual network interface card (VNIC) 255 in some embodiments. Each VNIC is responsible for exchanging messages between its VM and the software forwarding element 210. Each VNIC connects to a particular port of the software forwarding element 210. The software forwarding element 210 also connects to a physical network interface card (NIC) (not shown) of the host. In some embodiments, the VNICs are software abstractions of a physical NIC (PNIC) that are implemented by the virtualization software (e.g., by the hypervisor).

In some embodiments, the software forwarding element maintains a single port 260 for each VNIC of each VM. The software forwarding element 210 connects to a physical NIC (through a NIC driver (not shown)) to send outgoing messages and to receive incoming messages. In some embodiments, the software forwarding element 210 is defined to include a port 265 that connects to the PNIC's driver to send and receive messages to and from the PNIC.

The software forwarding element 210 performs message-processing operations to forward messages that it receives on one of its ports to another one of its ports. For example, in some embodiments, the software forwarding element tries to use data in the message (e.g., data in the message header) to match a message to flow based rules, and upon finding a match, to perform the action specified by the matching rule (e.g., to hand the message to one of its ports 260 or 265, which directs the message to be supplied to a destination GVM or to the PNIC).

In some embodiments, the software forwarding element 210 is a software switch, while in other embodiments it is a software router or a combined software switch/router. The software forwarding element 210 in some embodiments implements one or more logical forwarding elements (e.g., logical switches or logical routers) with software forwarding elements executing on other hosts in a multi-host environment. A logical forwarding element in some embodiments can span multiple hosts to connect GVMs that execute on different hosts but belong to one logical network.

Different logical forwarding elements can be defined to specify different logical networks for different users, and each logical forwarding element can be defined by multiple software forwarding elements on multiple hosts. Each logical forwarding element isolates the traffic of the GVMs of one logical network from the GVMs of another logical network that is serviced by another logical forwarding element. A logical forwarding element can connect GVMs executing on the same host and/or different hosts. In some embodiments, the SFE extracts from a data message a logical network identifier (e.g., a VNI) and a MAC address. The SFE in these embodiments uses the extracted VNI to identify a logical port group, and then uses the MAC address to identify a port within the port group.

Software switches (e.g., software switches of hypervisors) are sometimes referred to as virtual switches because they operate in software and they provide the GVMs with shared access to the PNIC(s) of the host. However, in this document, software switches are referred to as physical switches because they are items in the physical world. This terminology also differentiates software switches from logical switches, which are abstractions of the types of connections that are provided by the software switches. There are various mechanisms for creating logical switches from software switches. VXLAN provides one manner for creating such logical switches. The VXLAN standard is described in Mahalingam, Mallik; Dutt, Dinesh G.; et al. (May 8, 2013), VXLAN: A Framework for Overlaying Virtualized Layer 2 Networks over Layer 3 Networks, IETF.

The ports of the software forwarding element 210 in some embodiments include one or more function calls to one or more modules that implement special input/output (I/O) operations on incoming and outgoing messages that are received at the ports. In some embodiments, one of these function calls can be to the service engine 215, which determines whether the service containers 270 of the SVM 235 have to perform one or more service operations for the data message, and if so, either (1) assigns a service tag to the data message and provides the data message and the service tag to the SVM 235 or (2) provides the data message to the SVM 235 for the SVM to determine the set of services required for the data message.

Other examples of I/O operations that are implemented by the ports 260 include ARP broadcast suppression operations and DHCP broadcast suppression operations, as described in U.S. patent application Ser. No. 14/070,360. Other I/O operations can be so implemented in some embodiments of the invention. By implementing a stack of such function calls, the ports can implement a chain of I/O operations on incoming and/or outgoing messages in some embodiments. Also, in some embodiments, other modules in the data path (such as the VNICs, etc.) implement the I/O function call operations (such as the firewall function calls), instead of the ports 260.

For the service engine to perform its service check operation, the forwarding element port 260 that calls the service engine supplies a set of attributes of a message that the port receives. In some embodiments, the set of message attributes are message identifiers, such as traditional five tuple identifiers, which include the message's source identifier, destination identifier, source port, destination port, and protocol. Before supplying these identifiers to the service engine, the forwarding element port extracts these identifiers from a message that it receives. In some embodiments, one or more of the identifier values can be logical values that are defined for a logical network (e.g., can be IP addresses defined in a logical address space). In other embodiments, all of the identifier values are defined in the physical domains. In still other embodiments, some of the identifier values are defined in the logical domain, while other identifier values are defined in the physical domain.

In some embodiments, the service engine performs its service check operation itself based on service profile rules that are stored in the rule data storage 220. To perform its service check operation, the service engine 215 tries to match the received messages identifying attribute set with corresponding attribute sets that are stored for the service rules. In some embodiments, the service engine 215 receives the service profile rules that it stores in its storage 220 through the service engine interface (SEI) 227 from one or more controllers, as further described below.

In some embodiments, each service rule in the rule data storage 220 is specified in terms of (1) the same set of message identifiers (e.g., five-tuple identifiers) that the service engine receives from the port, and (2) a service tag that specifies a set of one or more service operations that a set of service containers 270 of the SVM has to perform. An identifier in a service rule can be specified in terms of an individual value or a wildcard value in some embodiments. In other embodiments, the identifier can further be defined in terms of a set of individual values or a group identifier, such as a security group identifier, a compute construct identifier, a network construct identifier, etc.

To match a received set of message attributes with the rules, the service engine compares the received set of attributes with the associated identifiers (e.g., five-tuple identifiers) of the service rules stored in the rule data storage 220. Upon identifying a matching rule that contains a service tag that specifies that a set of SVM containers 270 has to perform at least one service action, the service engine 215 supplies the data message along with the service tag to the message-processing engine 275 of the SVM 235. In some embodiments, the rule data storage 220 is defined in a hierarchical manner to ensure that a message rule check will match a higher priority rule before matching a lower priority rule, when message's identifiers match multiple rules.

Also, in some embodiments, the rule data storage 220 contains a default rule that specifies a default action for any message rule check that cannot match any other service rules; this default rule will be a match for all possible sets of message identifiers, in some embodiments, and ensures that the service rule engine will return an action for all received set of message identifiers. In some embodiments, the default rule will specify no service tag or a null service tag, which indicates that the SVM 235 does not need to be called to perform any service operation on the data message.

Multiple messages can have the same message identifier attribute sets, e.g., when the messages are part of one flow that is associated with one communication session between two machines. Accordingly, after matching a data message with a service profile rule in the storage 220, the service engine of some embodiments stores the service tag of this rule in a connection state data storage 225, so that it can subsequently use this tag to process service checks for other messages with similar identifying attribute sets.

Specifically, the connection state data storage 225 in some embodiments stores the service tag that the service engine 215 identifies for different message identifier attribute sets. In some embodiments, the connection state data storage 225 stores each returned tag with an identifier (e.g., a five-tuple identifier and/or a hash value) that is generated from the matching message identifier attribute set. Before checking with the rule data storage 220 for a particular message identifier attribute set, the service rule engine 215 of some embodiments checks the connection state data storage 225 to determine whether this storage has a cached service tag for this message identifier attribute set. If not, the service rule engine then checks the rule data storage 220. When the connection state data storage has an entry for the particular message identifier attribute set, the service engine supplies the cached service of the matching entry to SVM 235 along with the data message.

The service engine 215 communicates with the SVM 235 through the SVMI 230, in order to have the SVM containers 270 perform a set of services on data messages. For this check, the service engine in some embodiments receives the set of message attributes (e.g., the five tuples) that the port identified for (e.g., extracted from) the message. The service engine 215 forwards the received data message to the SVM 235 through the SVMI 230 along with the service tag that the service engine identified.

The SVM's message processing engine 275 receives data messages and service tags that are supplied by the service engine 215. This message-processing engine uses rules stored in a tag-based service rule storage to identify a set of service operations that have to be performed on a received data message. In some embodiments, each rule in this tag-based service rule storage stores a rule identifier and a service-chain action. The rule identifier of each rule in the tag-based service rule storage is expressed in terms of a service tag in some embodiments. In some embodiments, the service chain action of a rule in the tag-based service rule storage includes a list of one or more service containers that the engine 275 has to call for the data message. When this list contains more than one container, the message-processing engine 275 calls the containers according to their order on the service-chain action list in some embodiments.

For a particular data message, the message-processing engine uses the message's supplied service tag to identify a rule in the tag-based service rule data storage that has a matching service tag. When the message-processing engine finds a rule that has a rule identifier that matches the received data message's service tag (as supplied from the service engine 215), the message-processing engine 275 retrieves this rule's service chain action list and passes the data message to the containers identified on this list according to their order on the list. Like some embodiments of the rule data storage 220, the service rule storage, in some embodiments, stores the service rules in a hierarchical manner (that ensures that a message rule check will match higher priority rule before matching a lower priority rule), and/or stores a default rule that will match all received data messages.

In some embodiments, the SVM 235 also has a connection state data storage. Whenever its message-processing engine 275 identifies a rule in the rule data storage that matches the associated service tag of a message, this engine 275 not only has the set of containers (identified by the matching rule's service action list) perform a set of operations on the data message, but also stores the service action list in the connection state data storage that it can subsequently use to process service checks for other messages with similar service tags. In some embodiments, the connection state data storage stores each service action list with a rule identifier (e.g., the service tag) for the message. Before checking with the tag-based service rule storage for a particular service tag, the message-processing engine 275 checks the connection state data storage to determine whether this storage has a cached service action list for this service tag. If not, the engine 275 checks the rule data storage. When the connection state data storage has an entry for the message's associated service tag, the processing engine 275 has the set of containers (identified by the matching rule's service action list) perform a set of operations on the data message. Other embodiments do not use the connection state storage for the SVM 235 and its processing engine 275 (e.g., because the tag-based service rule storage does not store that many tag-based service rules).

In some embodiments, the host's service engine does not associate a received data message with a service tag when it determines that at least one service has to be performed for the data message. Instead, it just forwards the data message to the SVM after it determines that at least one service operation has to be performed on the data message. In some embodiments, the service engine 215 does not associate a service tag with a data message because the SVM's message-processing engine 275 uses security profile rules (in its rule storage) that specify the service action chain in terms of the data message header values (e.g., five tuple header values).

The service engine 215 uses service rules in a service rule storage (not shown) to determine whether at least one service has to be performed on a data message that the engine is processing. In some embodiments, a service rule in this storage has (1) a rule identifier expressed in terms of the received message identifier attribute set (e.g., five tuple header values) and (2) a service indicator that specifies whether at least one service has to be performed. The service indicator is a Boolean value in some embodiments. The service engine 215 caches the service indicator for the most-recently processed data message attribute sets in a connection state storage.

When the service indicator (in a cached record in the connection state storage or of a matching service rule in the rule storage) for a received data message specifies that a service has to be performed on the data message, the service engine 215 supplies the data message along with its identifying attribute set (e.g., its five tuple header values) to the message-processing engine 275 of the SVM 235.

This message-processing engine 275 then identifies a set of service operations that have to be performed on the data message by matching the received data message identifier attribute set (e.g., its set of header attributes) with the identifiers of the rules in the service profile rule storage. In some embodiments, the service profile rule not only has a rule identifier (e.g., expressed in terms of the message identifier attribute sets, such as five tuple identifiers), but also includes a service action chain list that specifies a sequential chain of one or more service containers that the message-processing engine 275 has to call to process the received data message. The SVM 235 obtains the service profile rules for the storage from one or more controllers (e.g., NSX manager 240) through a controller interface of this SVM in some embodiments, or through the service VM interface 230 in other embodiments.

The SVM 235 also has a connection state data storage in some embodiments. Whenever its message-processing engine 275 identifies a rule in the rule data storage that matches the received data message's attribute set, this engine 275 not only has the set of containers (identified by the matching rule's service action list) perform a set of operations on the data message, but also stores the service action list in the connection state data storage that it can subsequently use to process service checks for other messages with similar message identifier attribute sets. In some embodiments, the connection state data storage stores each service action list with a rule identifier (e.g., the message identifier attribute set) for the message. Before checking with the rule data storage for a particular message identifier attribute set, the message-processing engine 275 checks the connection state data storage to determine whether this storage has a cached service action list for this identifying attribute set. If not, the engine 275 checks the rule data storage. When the connection state data storage has an entry for the message identifier attribute set, the processing engine 275 has the set of containers (identified by the matching rule's service action list) perform a set of operations on the data message. As mentioned above, the SVM of FIGS. 1 and 2 may be implemented using a socket-based approach or a shared-memory-based approach.

Figure 5A:
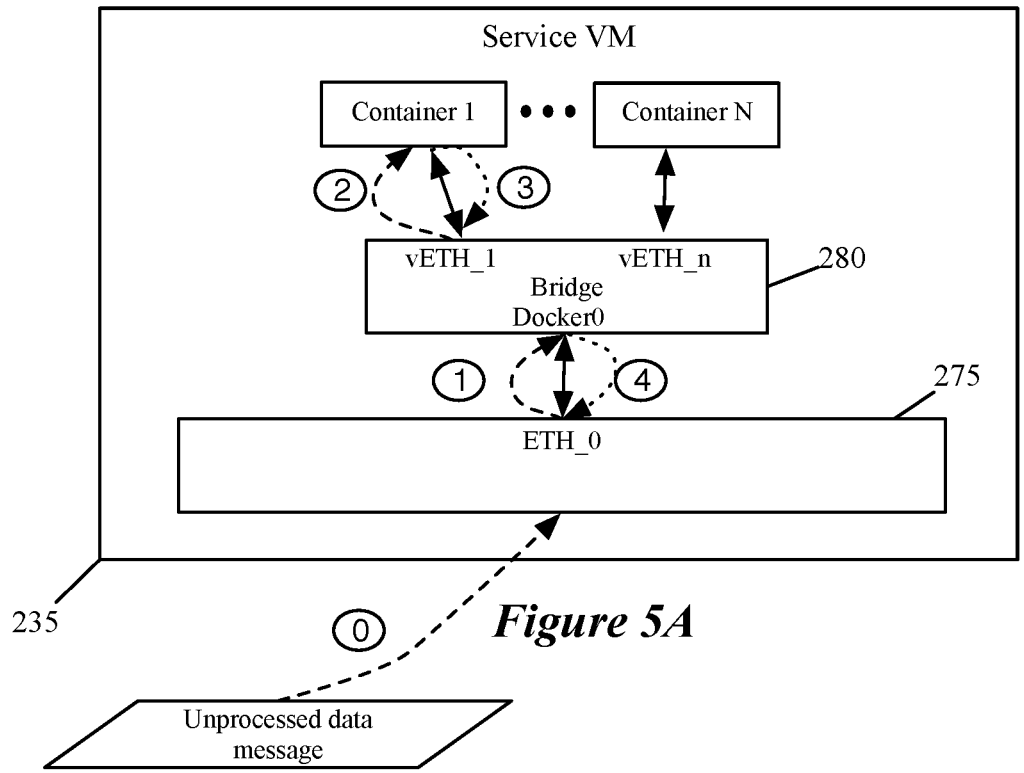
FIGS. 5A-B illustrate a service DCN sending a data message to multiple service containers to provide partner network services.
Figure 5B:
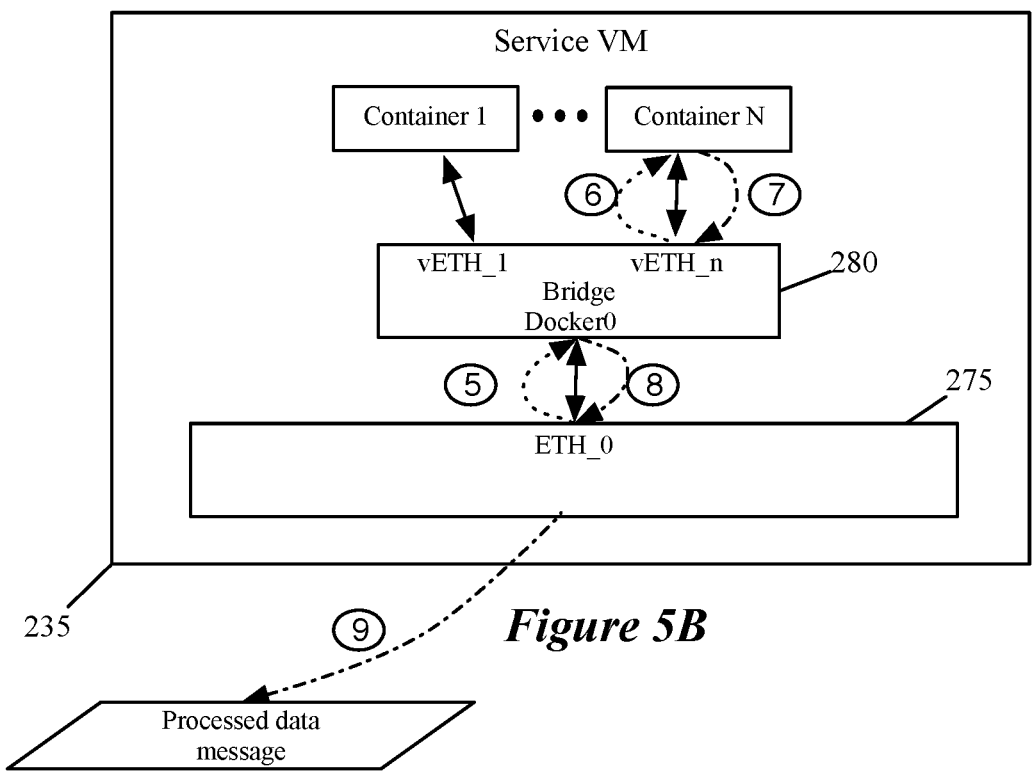

FIGS. 5A-B illustrate a service DCN configuration in which the service DCN 235 communicates with containers 270 through a bridge 280 having interfaces (e.g., Docker0 and vETH_1 through vETH_n). Each interface, in some embodiments, is assigned an IP address and has its own network stack to process data messages received at the interface. The IP address is in a same subnet as the Docker0 interface, in some embodiments. The Docker0 interface of the bridge connects, in some embodiments, to a virtual ethernet interface (e.g., port) of the service DCN, with additional interfaces of the bridge connecting to each of the partner service containers instantiated by the service DCN. In some embodiments, data messages received by the SVM are sent to the individual containers using the IP address of the Docker0 interface as a source IP address and an IP address of an interface (e.g., eth_0) of a container as the destination address. A single port is used, in some embodiments, as each interface has a different IP address and creates a different socket.

FIGS. 5A-B further illustrate a set of data messages being passed from a message processing engine 275 of service VM 235 to a set of containers 270 beginning with container 1 and ending with container N. Operation '0' represents message processing engine 275 receiving an unprocessed data message. The data message, in some embodiments, is received from a port 260. In some embodiments, the data message is received from port 260 through service engine 215 and service VM interface 230. The data message, in some embodiments, is accompanied by a service tag that indicates the services required for the data message. In some embodiments, SVM 235 stores policies that are applied to the data message (e.g., data message attributes of the data message are compared to data message attributes specified in a set of policies) to determine the required services for the data message. In some embodiments, based on the service tag or the stored policies, the SVM determines a service chain (i.e., an ordered set of service containers that the data message is sent to for processing). A message processing engine, in some embodiments, determines a next service to provide (or, after a last service has been provided, a destination) as data messages are received from either the port 260 or a container 270.

Once the service chain or next service is determined, the message processing engine sends the data message (indicated by operation '1') to the bridge 280. In some embodiments, the data message is addressed to the IP address of the interface of container 1 connected to vETH_1. Bridge 280 then sends the data message (in operation '2') to the first identified container, container 1. Container 1 then provides the partner network service and returns the data message to the bridge 280 (as operation '3') which returns the message to the message processing engine 275 (as operation '4').

FIG. 5B illustrates message processing engine 275 sending the data message to bridge 280 (as operation '5') and on to container N (as operation '6'). Container N is the last service container in a service chain that began at container 1 and ends at container N. After receiving the data message, container N provides the final partner network service. After providing the partner network service, container N returns the data message to the bridge (as operation '7') with a destination IP address of ETH_0 so that the data message is returned (as operation '8') to the message processing engine 275. When message processing engine 275 determines that the data message has traversed the complete service chain, message processing engine 275 forwards the data message back to the port 260 from which it was received (e.g., through service VM interface 230 and service engine 215).

In some embodiments, a data message is dropped by one of the service containers (e.g., a firewall), and no further containers in the service chain are provided with the message by message processing engine 275 because the data message is not returned to service processing engine 275. In some embodiments, certain containers are provided a received data message in parallel so that partner network services that do not (or are unlikely to) modify the data message can be provided in parallel. In some embodiments, the message processing engine determines that one of the service containers providing processing in parallel, and that comes earlier in the service chain than a second parallel service container, has modified the data message (or dropped the data message) and resends the modified data message to the subsequent service container for providing the service to the modified data message (or drops the data message returned from the second parallel service container). Some embodiments use a shared memory to provide data messages to service containers instead of (or in addition to) using the interfaces of a bridging element.

Figure 6:
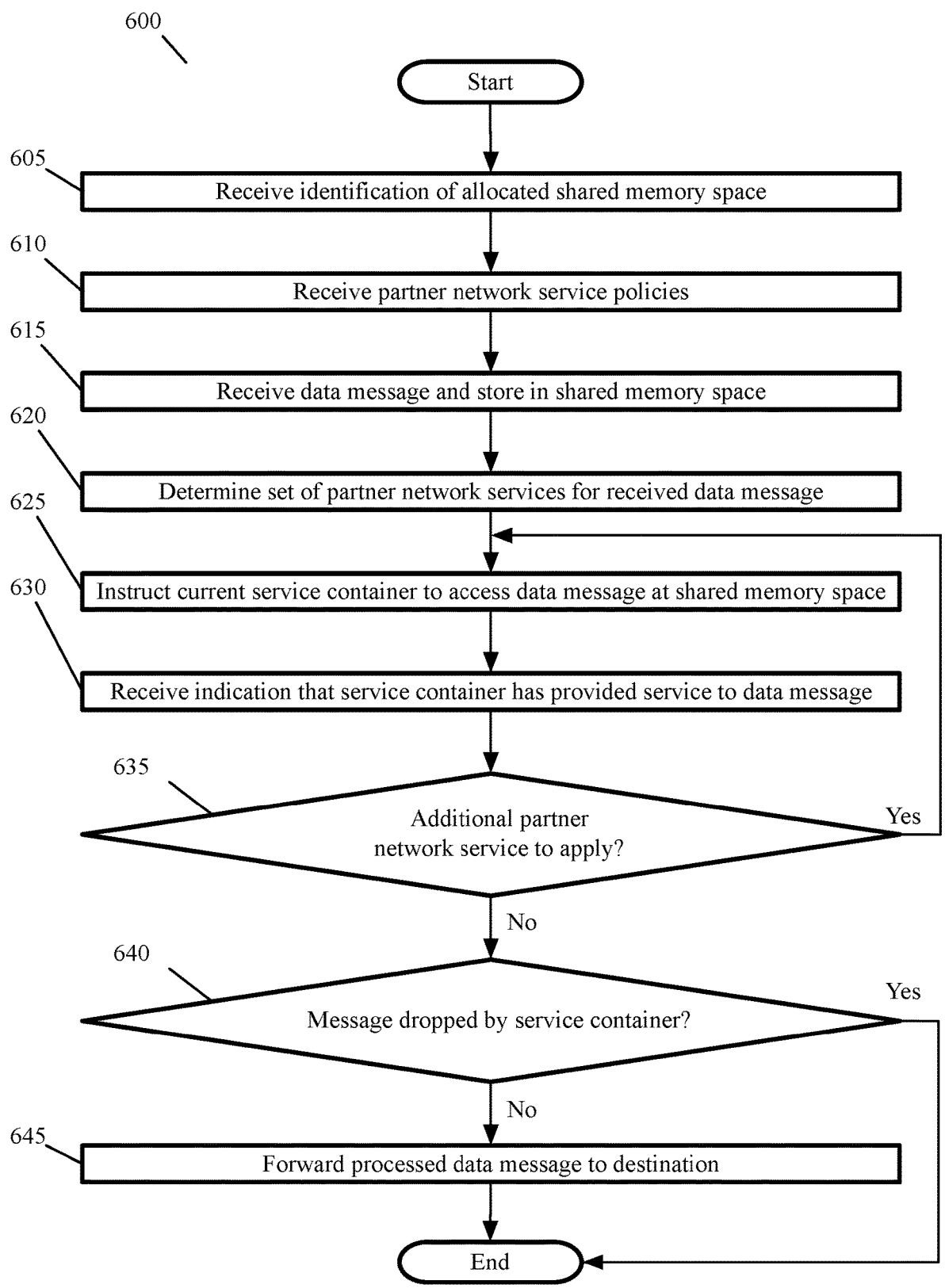
FIG. 6 conceptually illustrates a process for configuring a service DCN to allocate and use a shared memory space in some embodiments.

FIG. 6 conceptually illustrates a process for configuring a service DCN (e.g., service VM 235) to allocate a shared memory to a service DCN and service containers instantiated by the service DCN and using the shared memory to provide the services. In some embodiments, process 600 is carried out by a service DCN (e.g., photon operating system running on the service DCN for hosting and communicating with the service containers). Process 600 begins by receiving (at 605) an identification of an allocated memory space that will be accessible to (shared by) multiple containers and processes. The allocated memory is shared by a service DCN and containers executing on the service DCN, and, in some embodiments, is also shared by a host (or a process of the host) on which the service DCN executes. In some embodiments, the containers are configured to share an IPC namespace with the host (e.g., by using the "--ipc=host" and "mount/dev/shm" commands). The shared memory, in some embodiments, is larger than two data messages (e.g., larger than 3000 bytes, assuming a maximum transmission unit (MTU) of 1500 bytes). In some embodiments, memory space is allocated by a management compute node which also sends the identification of the allocated memory space. The portable operating system interface (POSIX) is used, in some embodiments, to create the shared memory.

In some embodiments, receiving the identification of the shared memory space, includes receiving configuration data for instantiating message queues to provide a means of communication between the service DCN and the instantiated partner network service containers. In some embodiments, each process running on the container is provided with a pair of message queues (one for each direction of communication with the service DCN). In some embodiments, the message queues are used for control messages as well as communications regarding received data messages. Message queues, in some embodiments, are instantiated as part of instantiating the service containers and not as part of the shared memory allocation.

In addition to receiving identification of allocated shared memory space, the process receives (at 610) a set of partner network service policies. The network service policies specify partner network services that should be applied to data messages received by the service DCN. In some embodiments, the policies are specified in terms of service tags generated by a service engine (e.g., service engine 85) or are specified in terms of data message attributes (e.g., five tuple header values) as described in relation to FIG. 2. One of ordinary skill in the art will appreciate that operations 605 and 610, in some embodiments, are independent of each other, and in some embodiments are performed in reverse order or may be performed at the same time (e.g., received configuration data includes data identifying the allocated memory space and the set of partner network service policies).

After being configured, a data message is received (at 615) and stored in the shared memory space. In some embodiments, the data is stored by the host in a memory shared by the host machine (or a process of the host machine), the service DCN, and the containers. In some embodiments, the data message is stored by the service DCN in the memory shared by the service DCN and the service containers. A data message, in some embodiments, is stored along with data indicating the length of the data message. In some embodiments, access to the shared memory is controlled using a synchronization mechanism (e.g., semaphore or mutex). In some embodiments, the shared memory is a named shared memory that is accessible by all processes executing on a same device. The shared memory, in some embodiments, is only able to be modified by a single process or device ("single writer") even while multiple processes or devices can read from the shared memory ("multiple reader"). Using a named shared memory, in some embodiments, keeps signaling intact even if shared memory gets corrupted.

For a stored data message, the process determines (at 620) the set of partner network services required by the data message. In some embodiments, the set of partner network services is determined based on a service tag associated with the stored data message. The determination, in some embodiments, is based on a set of received service policies.

Once a service chain (i.e. ordering of services to provide to the data message) has been determined for a data message, the process instructs (at 625) a current service container in the service chain to access the data message from the shared memory space. In some embodiments, the instructions are communicated to the service container through a message queue. Messages sent using the message queue, in some embodiments, include a message type identifier (e.g., control message, data message, etc.), a container ID, and a message ID. In some embodiments, the service DCN process that communicates with the containers through the message queue is configured with a message queue identifier for each container upon container (or message queue) instantiation. In some embodiments, a set of service containers that do not (or are not likely to) change the content of the data message are all sent a message instructing the service container to access the shared memory to provide the partner network service provided by the service container in parallel with the other service containers in the set of service containers.

Once a service container provides its service, the process receives (at 630) an indication that the service container has provided the service. In some embodiments, the indication is a message sent using the message queue. A message sent through the message queue, in some embodiments, indicates whether the service container, in providing the service, (1) changed the contents of the data message, (2) did not change the contents of the data message, or (3) dropped the data message (e.g., a firewall determined that the message is not allowed according to a set of firewall policies). In embodiments in which a set of containers is instructed to provide services in parallel with other service containers, the service DCN keeps track of which service in the service chain is a current service in order to resend instructions to provide a service to subsequent services if the current service indicates that it has changed the data message.

The process then determines (at 635) whether the stored data message requires an additional network service. In some embodiments, the determination is based on the service chain identified (at 620) based on a service tag or set of service policies. If further services are required, the process identifies a new current service (or service container) in the service chain and returns to operation 625 until no further services are required.

If the process determines (at 635) that no further services are required (e.g., a service container has indicated that a data message has been dropped, or the last service in a service chain has been reached), the process determines (at 640) whether the data message has been dropped by any of the service containers. If the data message has not been dropped the process forwards (at 645) the data message to the data message destination. In some embodiments, forwarding the data message includes returning the data message to the port (or module) from which it was received. In embodiments, in which the allocated memory is shared by a host (or host process) a message is sent to a host process to indicate that the partner network services provided at the service DCN have been provided. Once the process forwards the data message to its destination or determines (at 640) that the data message has been dropped by a service container, the process ends.

Figure 7:
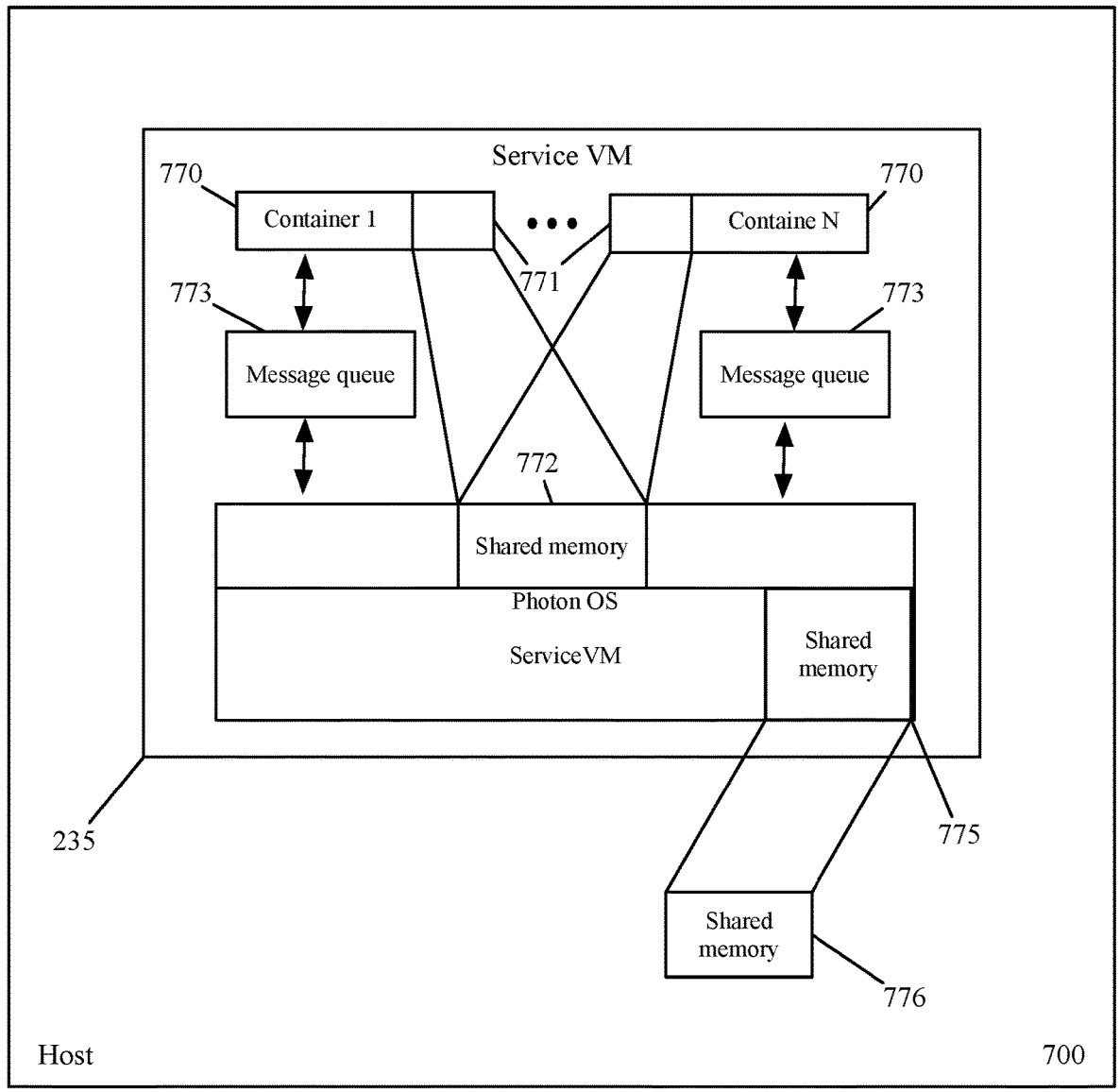
FIG. 7 illustrates a service VM implemented with a shared memory of the service VM to be accessed by multiple containers.

FIG. 7 illustrates a service virtual machine 235 configured to provide the partner network services using a memory 772 allocated to the service VM that is shared by (e.g., accessible to) each container. FIG. 7 further includes a second shared memory 775 that is a memory location 776 in the host 700 (e.g., in ESX kernel) that is accessible by an agent process of the service VM. FIG. 7 also illustrates a set of message queues 773 for communicating between the service VM and the service containers. In some embodiments, shared memory is created through the portable operating system interface (POSIX). As described in relation to FIG. 6, using the shared memory 772, in some embodiments, includes copying a data message to shared memory 772 from the shared memory 776 and using a synchronization control mechanism (e.g., semaphore) and a message queue 773 for signaling to service containers 770 that a data message is available in shared memory 772 and instructing the service container 770 to access shared memory 772 to provide the service to the data message. In some embodiments, the shared memory is an IPC namespace shared with the host (e.g., by using the "--ipc=host" and "mount/dev/shm" commands). The shared memory, in some embodiments, is larger than two data messages (e.g., larger than 3000 bytes, assuming a maximum transmission unit (MTU) of 1500 bytes).

FIG. 7 illustrates a service virtual machine 235 configured to provide the partner network services using a memory 772 allocated to the service VM that is shared by (e.g., accessible to) each container. FIG. 7 also illustrates a set of message queues 773 for communicating between the service VM and the service containers. In some embodiments, shared memory is created through the portable operating system interface (POSIX). As described in relation to FIG. 6, using the shared memory, in some embodiments, includes copying a data message to shared memory 772 from the existing memory and using a synchronization control mechanism (e.g., semaphore) and a message queue 773 for signaling to service containers 770 that a data message is available in shared memory 772 and instructing the service container 770 to access shared memory 772 to provide the service to the data message. In some embodiments, the shared memory is an IPC namespace shared with the host (e.g., by using the "--ipc=host" and "mount/dev/shm" commands). The shared memory, in some embodiments, is larger than two data messages (e.g., larger than 3000 bytes, assuming a maximum transmission unit (MTU) of 1500 bytes). After processing by the complete service chain, the processed data message is then copied to the shared memory 776 from shared memory 772. In some embodiments, reading from and writing (copying) to shared memory 776 is performed by a thin client or agent process of the SVM. This separation of the shared memory 776 in the host (e.g., the ESX kernel) from the shared memory 772 of the service VM, avoids any concern that a container could directly corrupt the data stored in the host memory location 776.

Figure 8:
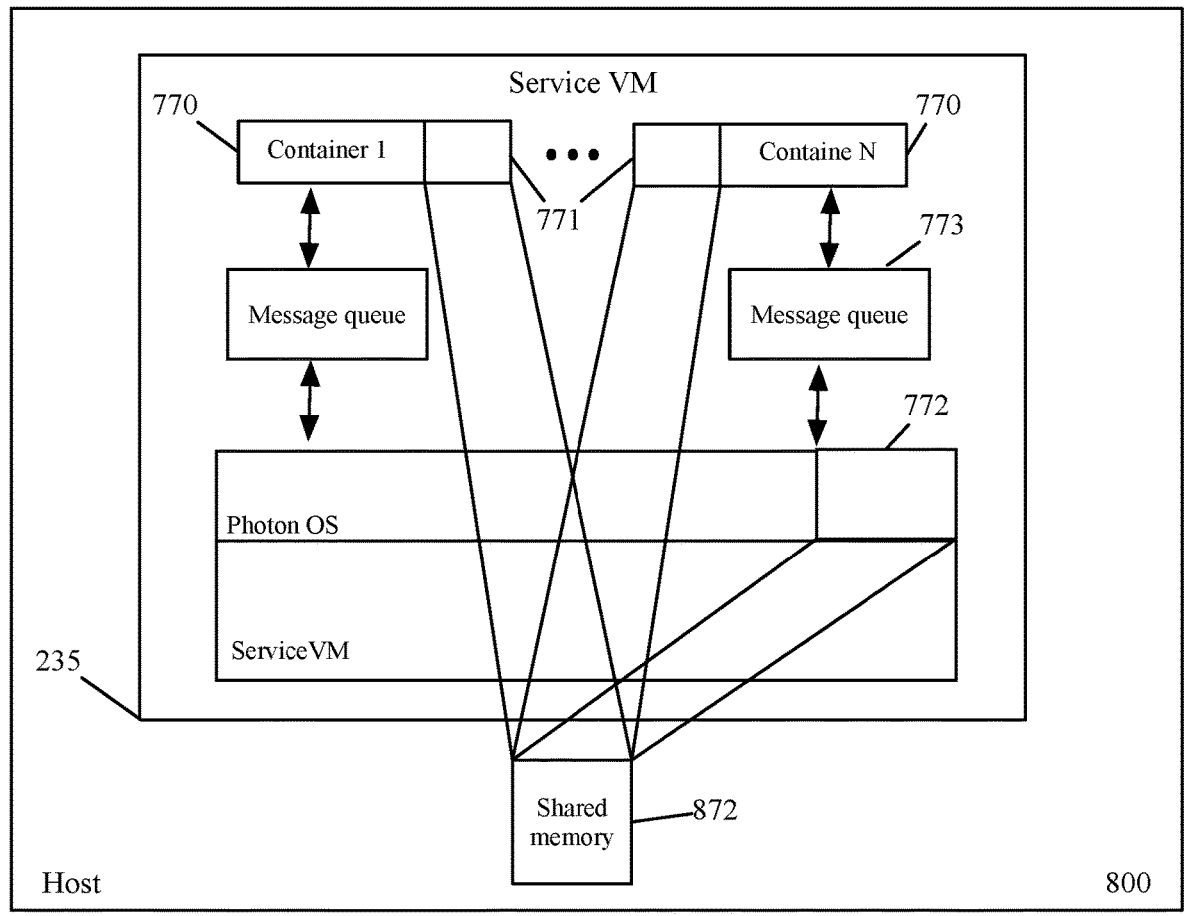
FIG. 8 illustrates a host and service VM implemented with a shared memory of the host to be accessed by multiple containers as well as a hypervisor.

FIG. 8 illustrates a service virtual machine 235 configured to provide the partner network services using a memory 872 of host 800 that is shared by (e.g., accessible to) service VM 235 and each container 770. FIG. 8 also illustrates a set of message queues 773 for communicating between the service VM and the service containers. A kernel operation, in some embodiments, opens a miscellaneous device driver for shared memory and opens the miscellaneous device driver. A service container 770, in some embodiments, uses the miscellaneous device driver for reading a data message. In some embodiments, settings of the shared memory (e.g. dvfilterklib_shm) are configured to allow access to the shared memory by multiple devices or processes. In the container space, some embodiments source all libraries and vmxnet application programming interfaces (APIs), add relevant header files, and make changes to the existing libraries to enable the shared memory access and data message processing operations of FIG. 6 to be carried out. As described in relation to FIG. 6, using the shared memory, in some embodiments, includes copying a data message to shared memory 872 from the existing memory and using a synchronization control mechanism (e.g., semaphore) and a message queue 773 for signaling to service containers 770 that a data message is available in shared memory 872 and instructing the service container 770 to access shared memory 872 to provide the service to the data message. The shared memory, in some embodiments, is larger than two data messages (e.g., larger than 3000 bytes, assuming a maximum transmission unit (MTU) of 1500 bytes).

Figure 9:
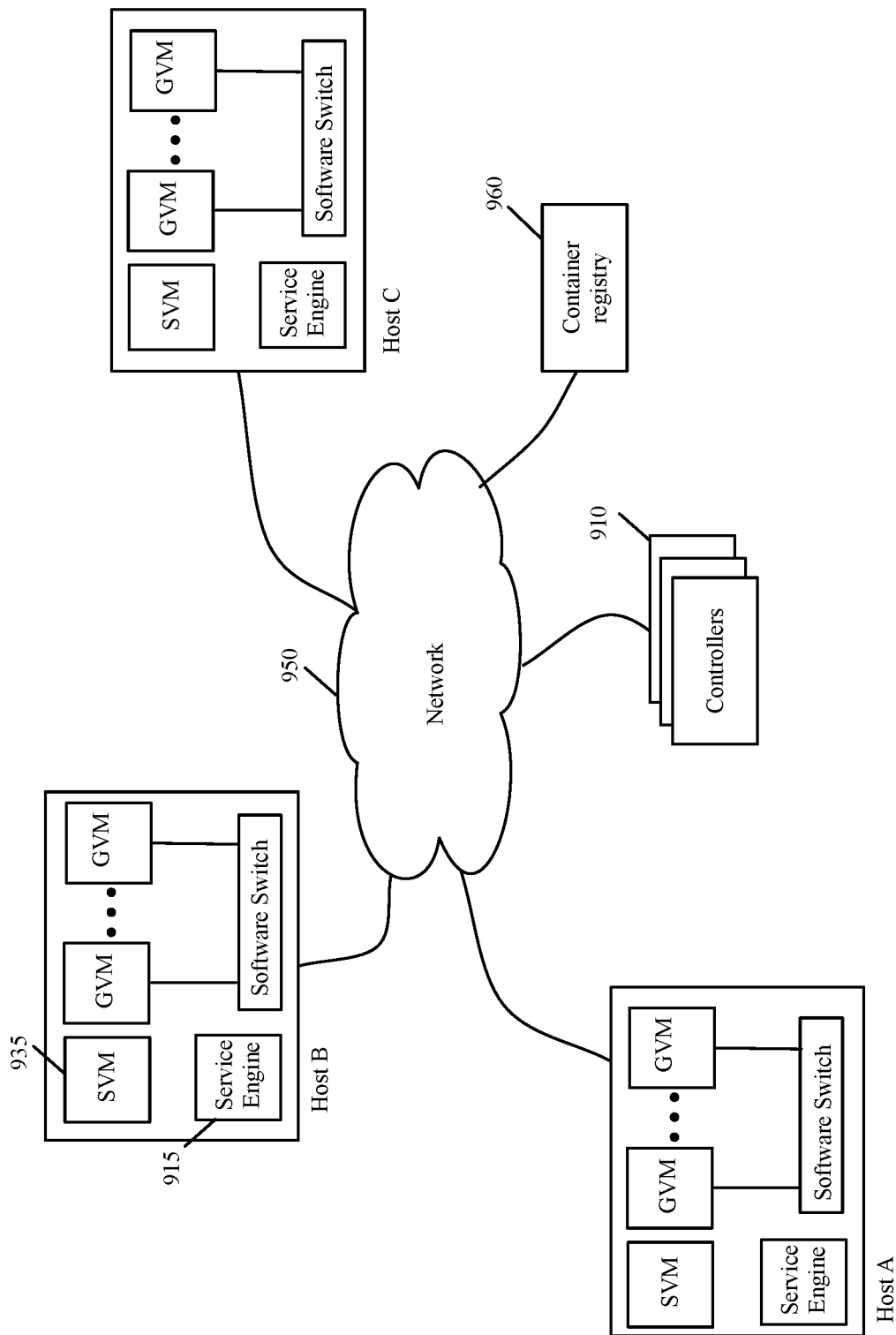
FIG. 9 illustrates an example of how the hypervisor service engines and the SVMs are managed in some embodiments.

FIG. 9 illustrates an example of how the hypervisor service engines 215 and the SVMs 235 are managed in some embodiments. This figure illustrates multiple hosts 900 in a datacenter. As shown, each host includes an SVM 935 (like the SVM 235) and a service engine 915 (like service engine 215). As shown, the SVMs 935 and service engines 915 are managed by one set of controllers 910. These controllers communicate with the hosts through a network 950 (e.g., through a local area network, a wide area network, a network of networks (such as the Internet), etc.). The hosts are also communicatively connected through this network 950.

In some embodiments, a datacenter operator maintains a service container registry 960. When the operator purchases network virtualization services (for providing logical networks) for a data center and provides the network virtualization services to their customers for managing networks in their cloud environment, the operator in some embodiments gets the ability to deploy an SVM on each host.

On this host, the network virtualization service provides a service engine filter that can be set off the ports of the SFE on the host. In some embodiments, the service engine pushes all data messages to the SVM without performing any network service. When the datacenter operator purchases the service partner's solutions, the partner container image is uploaded to the container registry maintained by the operator. The operator can install the service container application solution on this SVM. Based on the customer's purchase agreement, the service could be extended to the customer of the datacenter.

Under this approach, the deployment of a service will take a fraction of time. Current existing techniques use a virtualization compute manager to deploy an SVM installed on a host, each time another service is requested for a host. This approach slows down the addition of a service to a host. The container-based SVM approach of some embodiments, on the other hand, is rather fast because once the container-based SVM is installed on a host, new services can be quickly deployed for a customer by just enabling these services for the customer on this SVM. No new SVM needs to be deployed.

In some embodiments, the SVM runs a Linux Operating System. On this SVM, various socket, kernel and management tools will be pre-installed (such as dvfilterklib, vmci, vsock kernel, and VMtools of VMware Inc.). At time of install, the SVM also gets one or more modules installed and configured in order to allow a network virtualization controller to configure the SVM. For instance, in some embodiments, a rabbitmq client with an ovf parameter is set to the managing controller's IP address so that the client can access a rabbitmq server on the controller. This establishes the channel of communication between controller and the SVM.

In the control plane, any service command from the controller to the SVM will be relayed to the client running in the SVM. In some embodiments, the service profile rule data store and service instance are created in the SVM kernel. In the dataplane, there is a single filter added to the VNIC or SFE-port of a GVM. This filter will redirect the data messages to the SVM. Within the SVM, based on the service instance information received from the control plane, appropriate service will be provided to the message.

This approach reduces significant kernel memory consumption as well, since there will be only one fastpath agent and corresponding slowpath agent running at any given time. This approach also allows multiple services to be sequentially performed by multiple service containers by including a service chain list of containers in a security profile rule for a particular data message flow.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
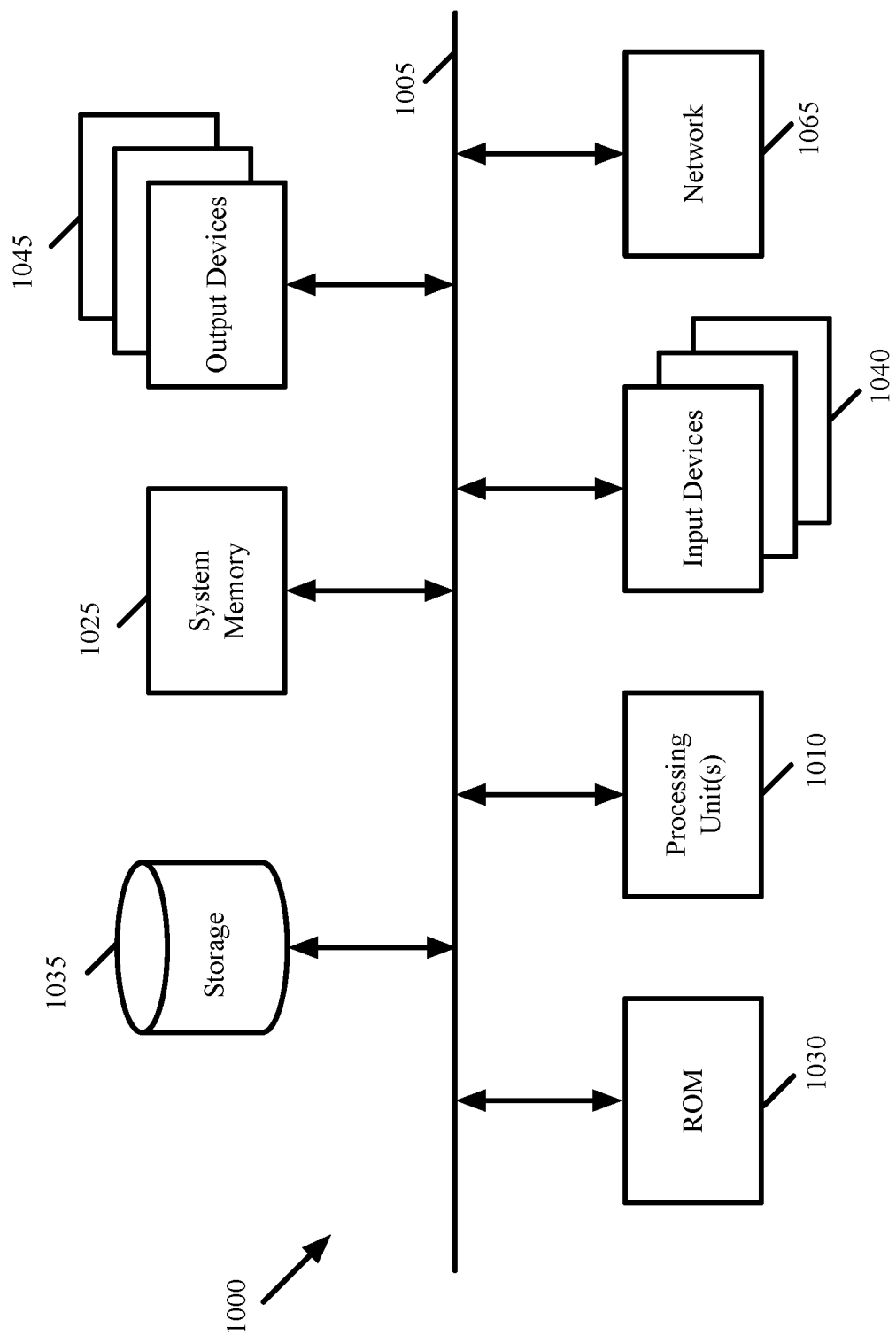
FIG. 10 conceptually illustrates a computer system with which some embodiments of the invention are implemented.

FIG. 10 conceptually illustrates a computer system 1000 with which some embodiments of the invention are implemented. The computer system 1000 can be used to implement any of the above-described hosts, controllers, and managers. As such, it can be used to execute any of the above described processes. This computer system includes various types of non-transitory machine readable media and interfaces for various other types of machine readable media. Computer system 1000 includes a bus 1005, processing unit(s) 1010, a system memory 1025, a read-only memory 1030, a permanent storage device 1035, input devices 1040, and output devices 1045.

The bus 1005 collectively represents all system, peripheral, and chipset buses that communicatively connect the numerous internal devices of the computer system 1000. For instance, the bus 1005 communicatively connects the processing unit(s) 1010 with the read-only memory 1030, the system memory 1025, and the permanent storage device 1035.

From these various memory units, the processing unit(s) 1010 retrieve instructions to execute and data to process in order to execute the processes of the invention. The processing unit(s) may be a single processor or a multi-core processor in different embodiments. The read-only-memory (ROM) 1030 stores static data and instructions that are needed by the processing unit(s) 1010 and other modules of the computer system. The permanent storage device 1035, on the other hand, is a read-and-write memory device. This device is a non-volatile memory unit that stores instructions and data even when the computer system 1000 is off. Some embodiments of the invention use a mass-storage device (such as a magnetic or optical disk and its corresponding disk drive) as the permanent storage device 1035.

Other embodiments use a removable storage device (such as a floppy disk, flash drive, etc.) as the permanent storage device. Like the permanent storage device 1035, the system memory 1025 is a read-and-write memory device. However, unlike storage device 1035, the system memory is a volatile read-and-write memory, such a random access memory. The system memory stores some of the instructions and data that the processor needs at runtime. In some embodiments, the invention's processes are stored in the system memory 1025, the permanent storage device 1035, and/or the read-only memory 1030. From these various memory units, the processing unit(s) 1010 retrieve instructions to execute and data to process in order to execute the processes of some embodiments.

The bus 1005 also connects to the input and output devices 1040 and 1045. The input devices enable the user to communicate information and select commands to the computer system. The input devices 1040 include alphanumeric keyboards and pointing devices (also called "cursor control devices"). The output devices 1045 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 10, bus 1005 also couples computer system 1000 to a network 1065 through a network adapter (not shown). In this manner, the computer can be a part of a network of computers (such as a local area network ("LAN"), a wide area network ("WAN"), or an Intranet, or a network of networks, such as the Internet. Any or all components of computer system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A non-transitory machine readable medium storing a program for performing a set of partner network services on a host computer executing a service data compute node (DCN), the program comprising sets of instructions for:
   receiving, at the service DCN, an identification of a set of container specifications to implement at the service DCN;
   retrieving the identified set of container specifications from a container registry storing a plurality of received container specifications including the identified set of container specifications, each container specification in the plurality of container specifications for a partner network service;
   instantiating a set of partner network service containers using the retrieved set of container specifications at the service DCN; and
   providing, using the instantiated partner network service containers, the set of partner network services to a set of data messages received by the service DCN.

2. The non-transitory machine readable medium of claim 1 further comprising a set of instructions for receiving a set of policies for determining which partner network services to apply to particular data messages received by the service DCN.

3. The non-transitory machine readable medium of claim 2, wherein the identification of the set of container specifications and the set of policies are received from a management DCN.

4. The non-transitory machine readable medium of claim 2, wherein policies in the set of policies specify a set of partner network services to apply to a data message based on attributes of the data message.

5. The non-transitory machine readable medium of claim 1, wherein the set of instructions for providing the set of partner network services to a particular data message comprises sets of instructions for:
   identifying a set of partner network service containers that apply to the particular data message; and
   using a network stack of the service DCN to (i) send the data message to each identified partner network service container, (ii) receive the data message from each partner network service container after the partner network service has been provided, and (iii) forward the data message towards its destination after the set of partner network services has been provided.

6. The non-transitory machine readable medium of claim 5,
   wherein the set of instructions for identifying the set of partner network services comprises a set of instructions for identifying an order in which the partner network services in the set of partner network services are to be provided, and
   wherein the network stack of the service DCN sends the data message to each identified partner service in the set of partner network services only after all partner network services in the set of partner network services that appear earlier in the identified order have been completed.

7. The non-transitory machine readable medium of claim 1, wherein the identification of the set of container specifications is received from a management DCN.

8. The non-transitory machine readable medium of claim 1, wherein the container registry is populated by a plurality of partner network service providers.

9. The non-transitory machine readable medium of claim 1, wherein the container registry comprises a plurality of partner network service container specifications from one partner network service provider.

10. The non-transitory machine readable medium of claim 1, wherein the set of partner network services comprises at least one of (i) a network address translation service, (ii) a firewall service, (iii) an intrusion detection service, and (iv) a load balancing service.

11. A method comprising:
    receiving an identification of a container specification for a first service container to instantiate on a service virtual machine (SVM) in order to perform a first middlebox service operation, the SVM executing a second service container that performs a second middlebox service operation;
    retrieving the identified container specification from a container registry storing a plurality of received container specifications including the identified container specification, each container specification in the plurality of container specifications for a service container that performs a middlebox service operation, wherein at least one of the container specifications is provided by a third-party middlebox service provider;

using the retrieved container specification to instantiate the first service container to execute on the SVM along with the second service container; and using the instantiated first service container to perform the first middlebox service operation on a set of data messages received by the SVM.

12. The method of claim 11 further comprising receiving a set of policies for determining which middlebox service operations to perform on particular data messages received by the SVM.

13. The method of claim 12, wherein the identification of the container specification and the set of policies are received from a management data compute node.

14. The method of claim 12, wherein policies in the set of policies specify which middlebox service operations to perform on particular data messages based on attributes of the data messages.

15. The method of claim 11, wherein the set of data messages is a first set of data messages, wherein the second service container performs the second middlebox service operation on a second set of data messages.

16. The method of claim 15, wherein the first set of data messages and second set of data messages are the same.

17. The method of claim 11, wherein the identification of the container specification is received from a management data compute node.

18. The method of claim 11, wherein the set of middlebox service operations comprises at least one of (i) a network address translation service, (ii) a firewall service, (iii) an intrusion detection service, and (iv) a load balancing service.

* * * * *